(12) United States Patent
Cardin

(10) Patent No.: US 6,450,197 B1
(45) Date of Patent: Sep. 17, 2002

(54) MAGNETICALLY ACTUATED VALVE SYSTEM

(75) Inventor: Joseph M. Cardin, Yorba Linda, CA (US)

(73) Assignee: Vacco Industries, Inc., South El Monte, CA (US)

( * ) Notice: Subject to any disclaimer, the term of this patent is extended or adjusted under 35 U.S.C. 154(b) by 0 days.

(21) Appl. No.: 09/771,150

(22) Filed: Jan. 26, 2001

(51) Int. Cl.⁷ ................................................ F17D 1/04
(52) U.S. Cl. .............. 137/595; 137/614.11; 251/129.16
(58) Field of Search ........................... 137/595, 614.11, 137/614.12, 614.19, 549; 251/129.16

(56) References Cited

U.S. PATENT DOCUMENTS 2,891,577 A * 6/1959 Stewart
3,443,585 A * 5/1969 Reinicke ..................... 137/595
3,661,178 A * 5/1972 Wichmann ................... 137/595

* cited by examiner

Primary Examiner—Stephen M. Hepperle
(74) Attorney, Agent, or Firm—Pillsbury Winthrop LLP

(57) ABSTRACT

A magnetically actuated valve system for controlling fluid flow through a first conduit and a second conduit. A first sealing structure associated with the first conduit is moveable in response to a magnetic force to an open position and spring biased toward a closed position. The closed position prevents fluid flow through the first conduit. A second sealing structure associated with the second conduit is moveable in response to a magnetic force in a second direction, substantially opposite to the first direction, to an open position and biased toward a closed position. The closed position prevents fluid flow through the second conduit. A magnetic actuator assembly is constructed and arranged to actuate the first and second sealing assemblies substantially simultaneously by moving the first and second sealing structures in the first and second directions, respectively.

20 Claims, 9 Drawing Sheets

MAGNETICALLY ACTUATED VALVE SYSTEM

FIELD OF THE INVENTION

This invention relates generally to a magnetically actuated valve system and more specifically to a magnetically actuated valve system in which at least two solenoid valves are actuated by a single electromagnetic actuator.

BACKGROUND OF THE INVENTION

In typical electromagnetically actuated propellant valves used in bi-propellant systems, a first propellant (fuel) flows through an upstream valve to a downstream valve such that the first propellant will be directed into contact with a second propellant (oxidizer) flowing through a second upstream valve to a second downstream valve within a thruster portion of an engine or the like, whereby the combined propellant will be ignited. The flow of each of the first and second propellants is simultaneously controlled and maintained in the correct proportions by a single magnetic circuit actuating two magnetically linked valves, each housed in a manifold assembly.

U.S. Pat. Nos. 3,443,585, 3,472,277 and 4,223,698 disclose various magnetically actuated valve systems wherein a single electromagnetic excitation will actuate each of two valve members, each of which serves its own pressure-fluid flow. In the '585 patent, a permanent magnet is the common middle element of two separate solenoid-actuated magnetic circuits. Excitation of one solenoid opens both valves; excitation of the other solenoid closes both valves; and the permanent magnet holds the actuated condition of both valves. The '277 and '698 patents each disclose an electromagnetic actuating system wherein a single solenoid coil actuates two magnetically linked valves to open condition, against the preload of springs to load valve members in the valve-closing direction. In all cases, construction is highly specialized and complex, leading to unduly expensive products.

U.S. Pat. No. 5,450,876 discloses an electromagnetically actuated multiple-valve construction within a single welded housing which contains each of two series-connected valves and a single magnetic circuit for concurrently operating an upstream and a downstream valve.

Consequently, there exists a need in the art for a valve system having the functional advantages of the '876 patent without a welded construction, which adds weight. There also exists a need in the art for a magnetically actuated valve system to provide a pair of magnetically operated valves movable between a power applied and a power removed position by a magnetic solenoid actuator assembly for simultaneously controlling and maintaining first and second propellants in the correct proportions through separate manifold assemblies of a single system. There also exists a need in the art to make a magnetically actuated valve system that is simpler, lighter and more cost effective.

BRIEF SUMMARY OF THE INVENTION

To meet the described need, one aspect of the invention provides a magnetically actuated valve system. The magnetically actuated valve system comprises a first conduit and a second conduit. A first sealing structure is moveable in response to a magnetic force to an open position and spring biased toward a closed position. The closed position prevents fluid flow through the first conduit. A second sealing structure is moveable in response to a magnetic force in a second direction, substantially opposite to the first direction, to an open position and biased toward a closed position. The closed position prevents fluid flow through the second conduit. A magnetic actuator assembly is constructed and arranged to actuate the first and second sealing assemblies substantially simultaneously by moving the first and second sealing structures in the first and second directions, respectively.

Other objects, features, and advantages of the present invention will become apparent form the following detailed description, the accompanying drawings, and the appended claims.

DETAILED DESCRIPTION OF THE INVENTION

Figure 1:
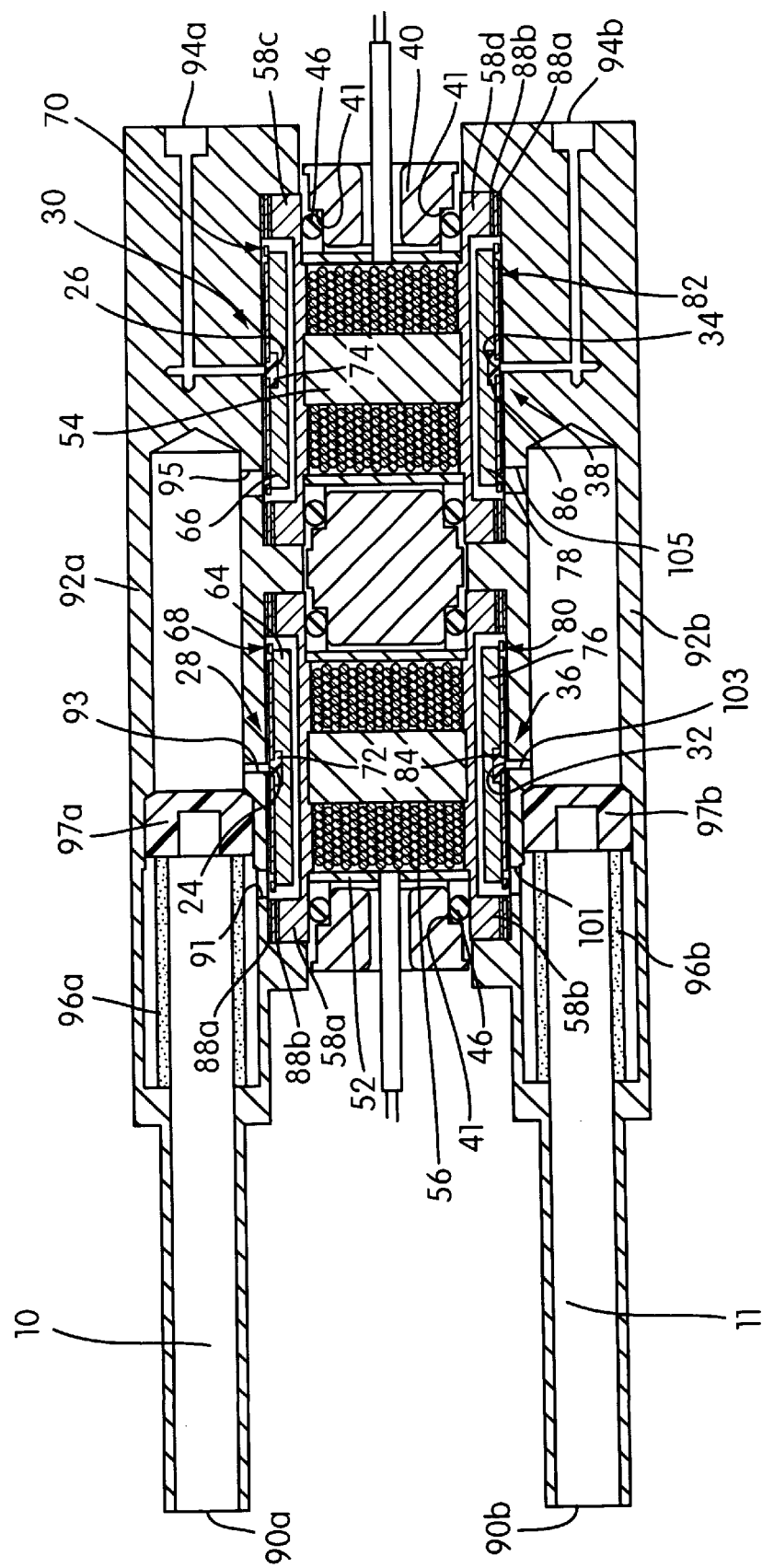
FIG. 1 is a cross section of a magnetically actuated valve system taken along the line 1—1 of FIG. 3 with the power removed.

Referring now more particularly to the drawings, FIGS. 1–9 show a preferred embodiment of a magnetically actuated valve system of the present invention. The magnetically actuated valve system comprises a first conduit, generally indicated at 10 and a second conduit generally indicated at 11 for providing fluid flowpaths for a fuel and an oxidizer, respectively. Fuel conduit 10 is machined or etched into a fuel manifold assembly, generally indicated at 12, to provide the fuel flowpath and has sealing structures 28, 30 disposed therein. Oxidizer conduit 11 is machined or etched into an oxidizer manifold assembly, generally indicated at 14, to provide the oxidizer flowpath and has sealing structures 36, 38 disposed therein. Each manifold assembly 12, 14 can be formed in the manner disclosed in copending U.S. patent application Ser. No. 09/257,186, the entire disclosure of which is incorporated herein by reference.

Magnetic solenoid actuators 48, 50 are disposed within a magnetic actuator assembly housing structure, generally indicated at 16. Magnetic solenoid actuator 48 is constructed and arranged to exert a magnetic force on sealing structures 28, 36 to substantially simultaneously actuate the same in opposite directions relative to one another. Magnetic solenoid actuator 50 is constructed and arranged to exert a magnetic force on sealing structures 30, 38 to substantially simultaneously actuate the same in opposite directions relative to one another.

Figure 2:
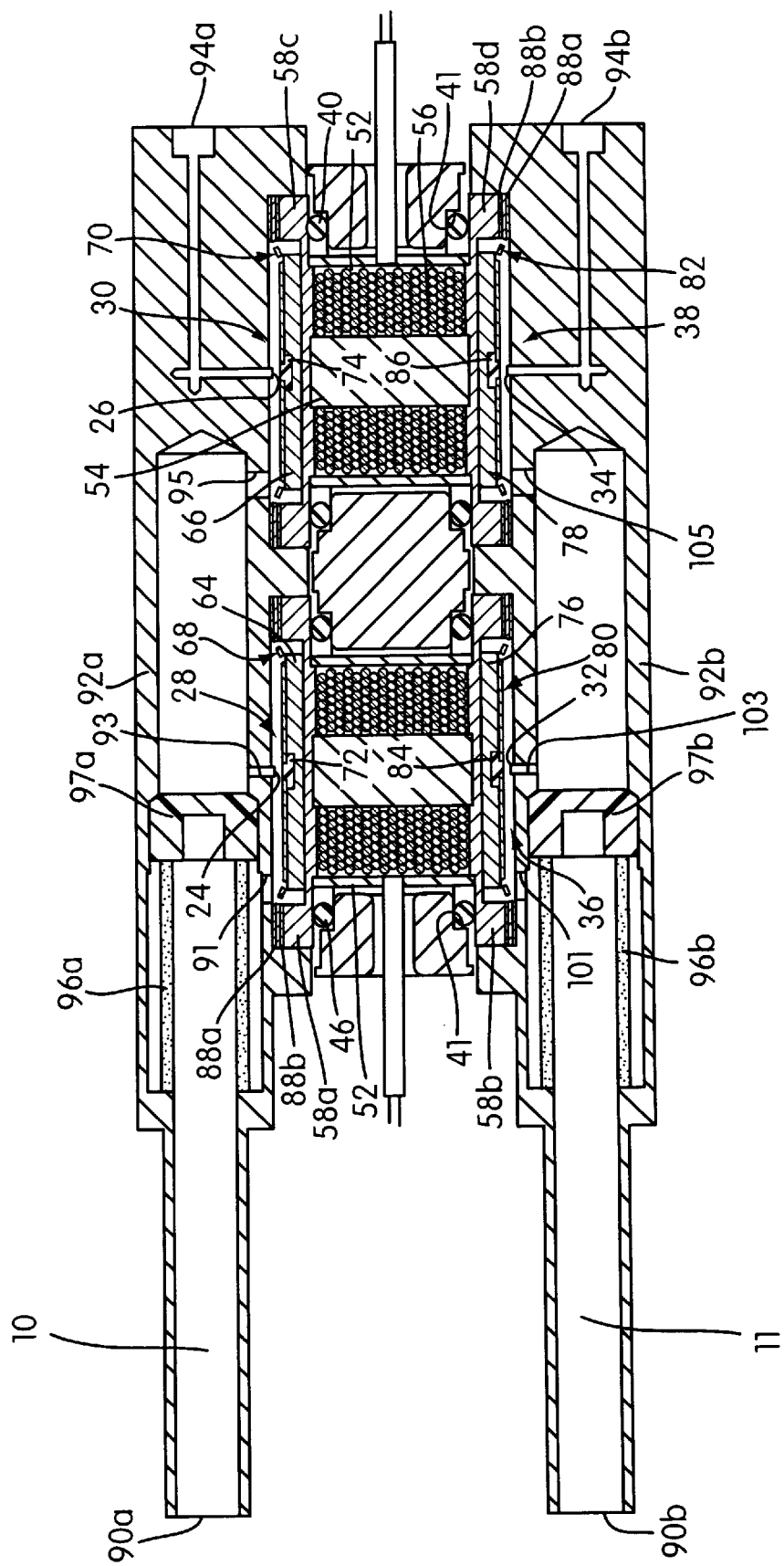
FIG. 2 is a cross section of the magnetically actuated valve system similar to FIG. 1, but with the power applied.

As best illustrated in FIGS. 1 and 2, fuel manifold assembly 12 and oxidizer manifold assembly 14 are of identical construction and are similarly described hereinbelow. Fuel manifold assembly 12 includes a pair of valve seats 24, 26 machined therein, by standard machining techniques, diffusion bonding or electron beam welding, to define an upstream and a downstream fuel valve, respectively. Valve seats 24, 26 are configured and positioned at inlets 91, 95 of the upstream and the downstream fuel valves, respectively. Similarly, oxidizer manifold assembly 14 comprises a pair of valve seats 32, 34 machined therein, by standard machining techniques, diffusion bonding or electron beam welding, to define an upstream and a downstream oxidizer valve, respectively. It may also be preferable to etch valve seats 24, 26 and 32, 34 in fuel and oxidizer manifold assemblies 12, 14, respectively, as taught in U.S. patent application Ser. No. 09/257,186, cited earlier herein. Valve seats 32, 34 are configured and positioned at each inlet 101, 105 of the upstream and downstream oxidizer valves, respectively.

Figure 3:
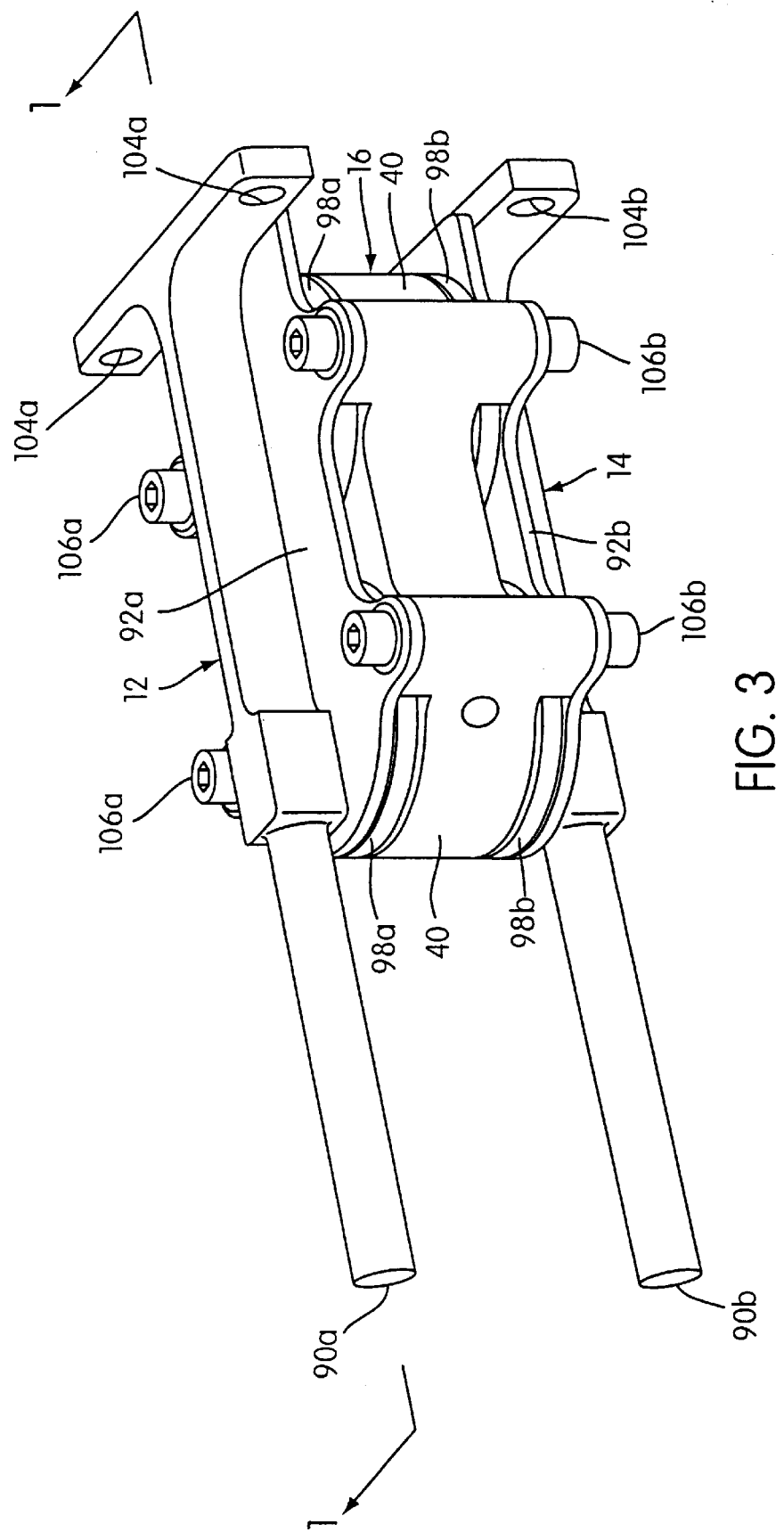
FIG. 3 is a perspective view of the preferred embodiment of the magnetically actuated valve system embodying the principles of the present invention.
Figure 4:
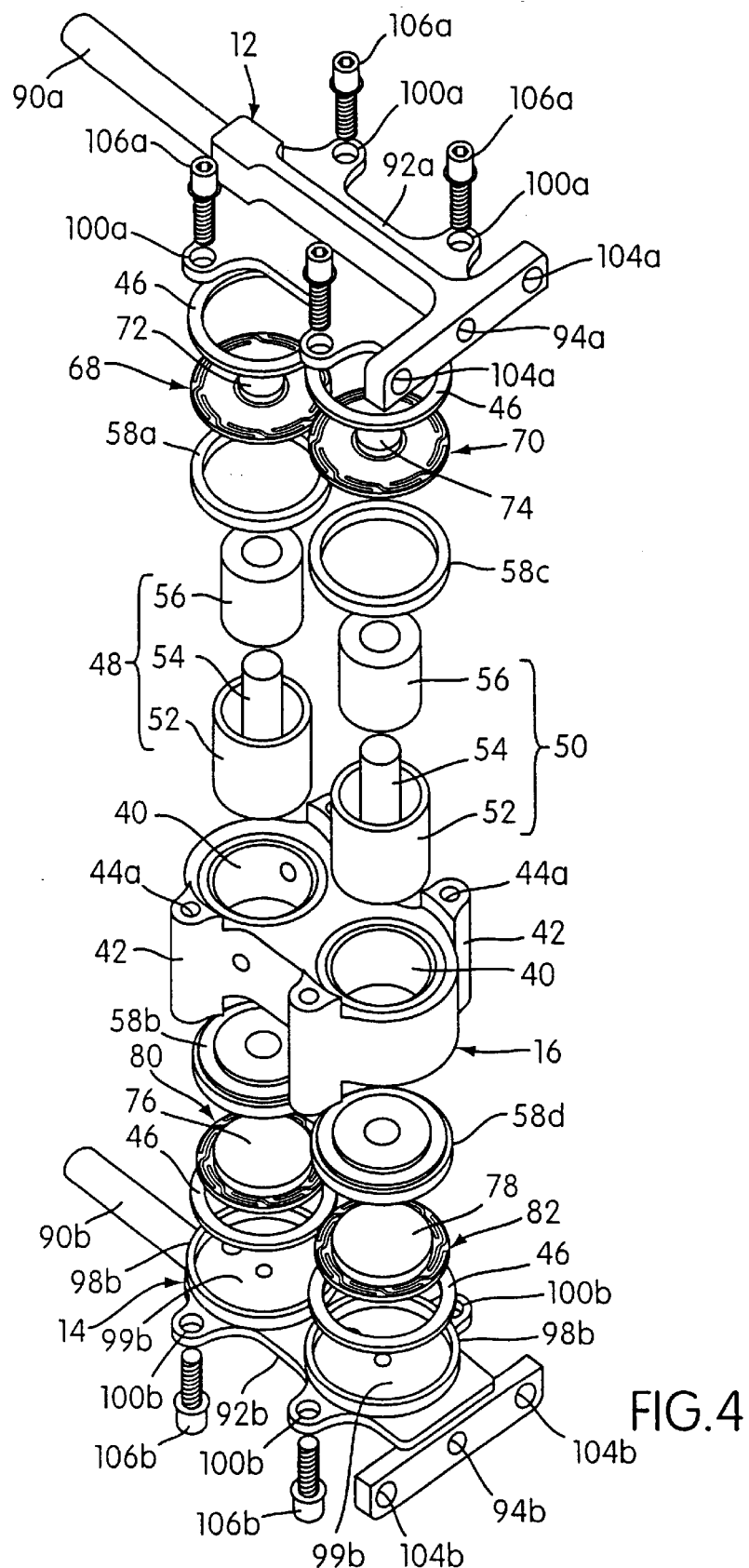
FIG. 4 is a perspective exploded view of the magnetically actuated valve system shown in FIG. 3.

As best shown in FIGS. 1–4, magnetic actuator assembly housing structure 16 comprises a pair of circumferentially extending magnetic actuator assembly receiving portions 40 integral with one another. Each circumferentially extending magnetic actuator assembly receiving portion 40 provides a groove 41 for carrying a sealing structure 46, with each groove 41 positioned on the opposite longitudinal ends of each magnetic actuator assembly receiving portion 40. As best shown in FIGS. 3 and 4, a pair of generally tubular fastener receiving portions 42 integrally extends from each magnetic actuator assembly receiving portion 40. Each fastener receiving portion 42 has one threaded fastener receiving orifice 44a on one longitudinal end thereof and another threaded fastener receiving orifice (not shown) on the opposite longitudinal end thereof. Magnetic actuator assembly housing structure 16 preferably is made of a low magnetic flux capacity material. It may be preferable to for magnetic actuator housing structure 16 to be made from aluminum or titanium. Housing structure 16 may be cast, forged or machined.

As best shown in FIG. 4, the magnetic actuator assembly comprises upstream magnetic solenoid actuator 48 and downstream magnetic solenoid 50. Upstream magnetic solenoid actuator 48 moves the fuel sealing structure 28 and the oxidizer sealing structure 36 to a power applied, open position. Similarly, downstream magnetic solenoid 50 moves fuel sealing structure 30 and oxidizer sealing structure 38 to a power applied, open position. Magnetic solenoid actuators 48, 50 are installed within magnetic actuator assembly receiving portions 40 of magnetic actuator assembly housing structure 16. Upstream and downstream magnetic solenoid actuators 48, 50 comprise solenoid cases 52, each of which generally surrounds a centrally positioned solenoid core 54. Each solenoid core 54 extends through a conductive coil 56, for example of copper, such that each conductive coil 56 is generally surrounded by solenoid case 52 on their radial exterior. It is contemplated that the two magnetic solenoid actuators 48, 50 may be operated independently or coupled electrically in series or parallel to normally operate substantially simultaneously, as further described below.

Isolation caps 58a, 58b, 58c, 58d engage opposite longitudinal sides of magnetic solenoid actuators 48, 50, respectively, to retain each magnetic solenoid actuator 48, 50 within one of circumferentially extending magnetic actuator assembly receiving portions 40 of magnetic actuator assembly housing structure 16. Isolation caps 58a, 58c are welded to fuel manifold assembly 12. Isolation caps 58b, 58d are welded to oxidizer manifold assembly 14. Isolation caps 58a, 58b, 58c, 58d may be made from titanium or any other low flux capacity material capable of exposure to the propellants and suitable for being welded to manifolds 12, 14.

Fuel sealing structure 28 includes a fuel armature member 64, an S-spring 68 and a sealing portion 72. Fuel sealing structure 30 is disposed downstream from fuel sealing structure 28 and includes a downstream fuel armature member 66 positioned downstream from upstream fuel armature member 64, an S-spring 70 and a sealing portion 74. S-springs 68, 70 bias sealing structures 28, 30 in closed positions to prevent fuel flow through first conduit 10. Fuel sealing structures 28, 30 are enclosed within fuel manifold 12 by isolation caps 58a, 58c.

Similarly, oxidizer sealing structure 36 includes an oxidizer armature member 76, an S-spring 80 and a sealing portion 84. Oxidizer sealing structure 38 is disposed downstream from oxidizer sealing structure 36 and includes a downstream oxidizer armature member 78 positioned downstream from upstream oxidizer armature member 76, an S-spring 82 and a sealing portion 86. S-springs 80, 82 bias sealing structures 36, 38 into closed positions to prevent oxidizer flow through second conduit 11. Oxidizer sealing structures 36, 38 are enclosed within oxidizer manifold 14 by isolation caps 58b, 58d.

It might be preferable for fuel and oxidizer manifold assemblies 12, 14 to include a plurality of diffusion bonded layers of sheet material, for example of titanium, having conduits 10, 11 etched therein to provide passageways for fuel and oxidizer respectively in the manner disclosed in copending U.S. patent application Ser. No. 09/257,186.

Various fuels and oxidizers could be used within fuel and oxidizer manifold assemblies 12, 14; however, the preferred fuel used in fuel manifold assembly 12 is monomethylhydrazine (MMH) and the preferred oxidizer used in oxidizer manifold assembly 14 is nitrogen tetroxide ($N_2O_4$). The fuel may flow through fuel manifold assembly 12 and oxidizer may flow through oxidizer manifold assembly 14 in a liquid or gaseous state.

Figure 5:
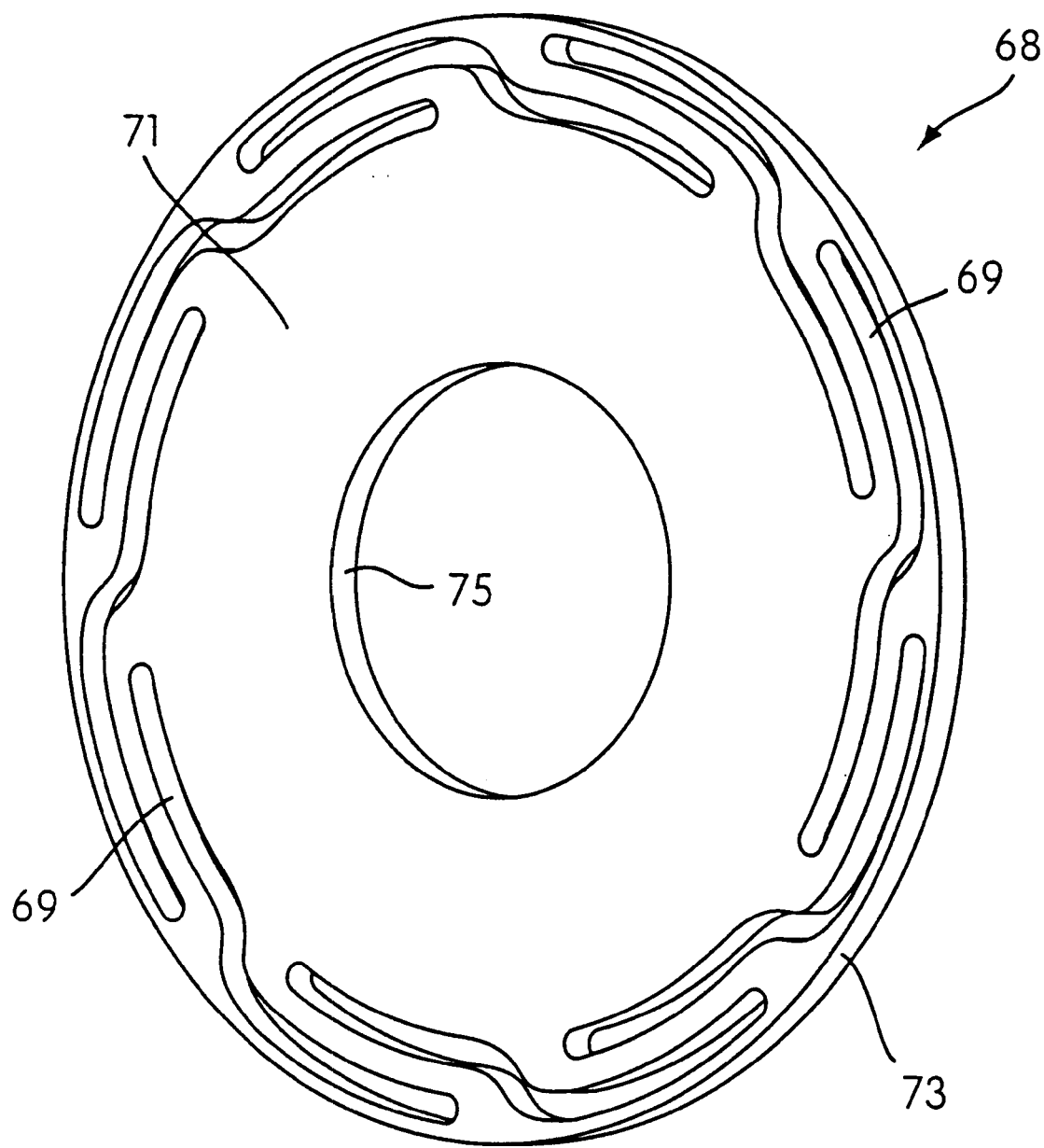
FIG. 5 is an enlarged perspective view of an S-spring of the magnetically actuated valve system shown in FIG. 4.
Figure 6:
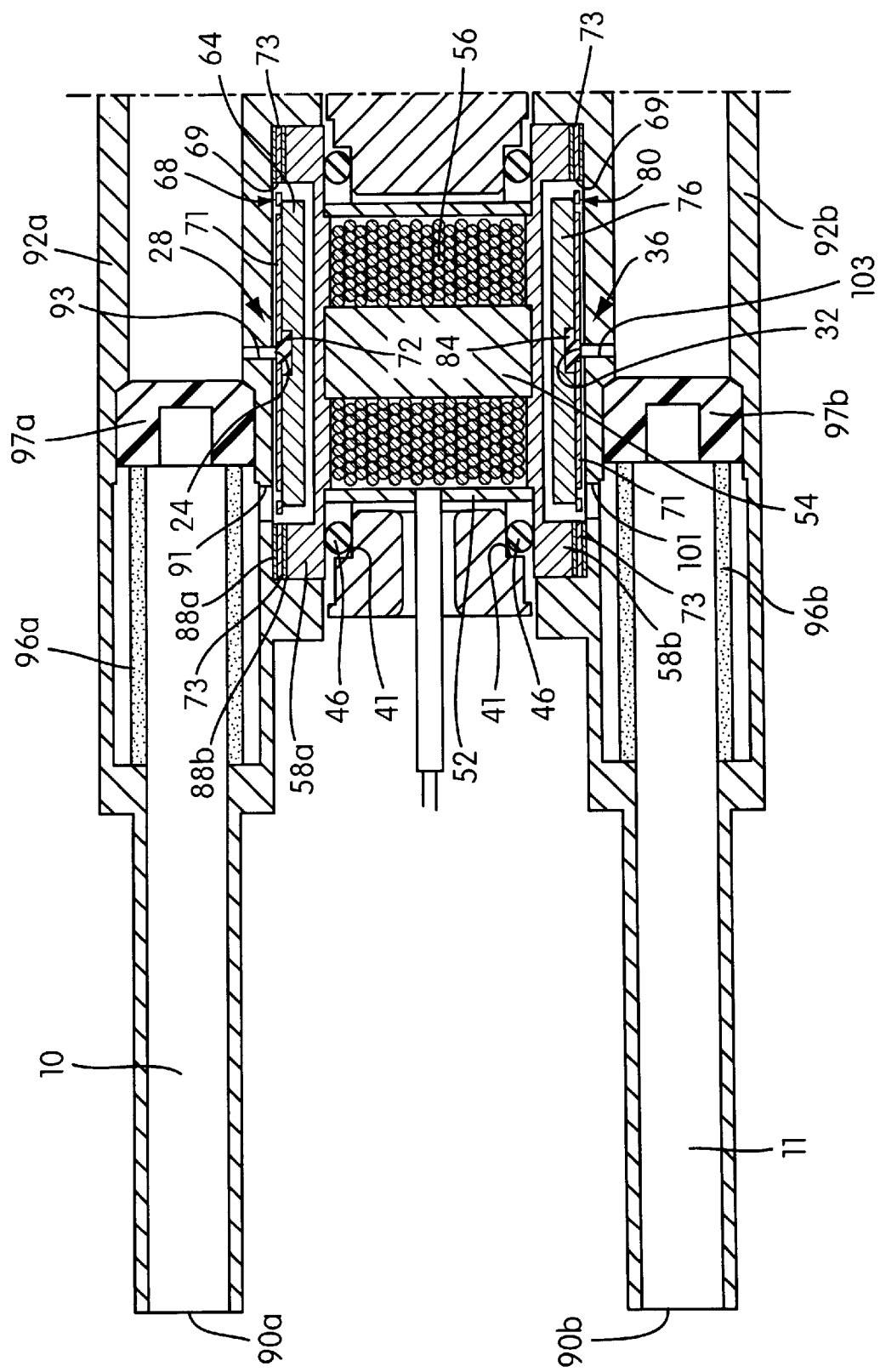
FIG. 6 is an enlarged cross section similar to FIG. 1 showing an upstream fuel valve and an upstream oxidizer valve with the power removed.
Figure 7:
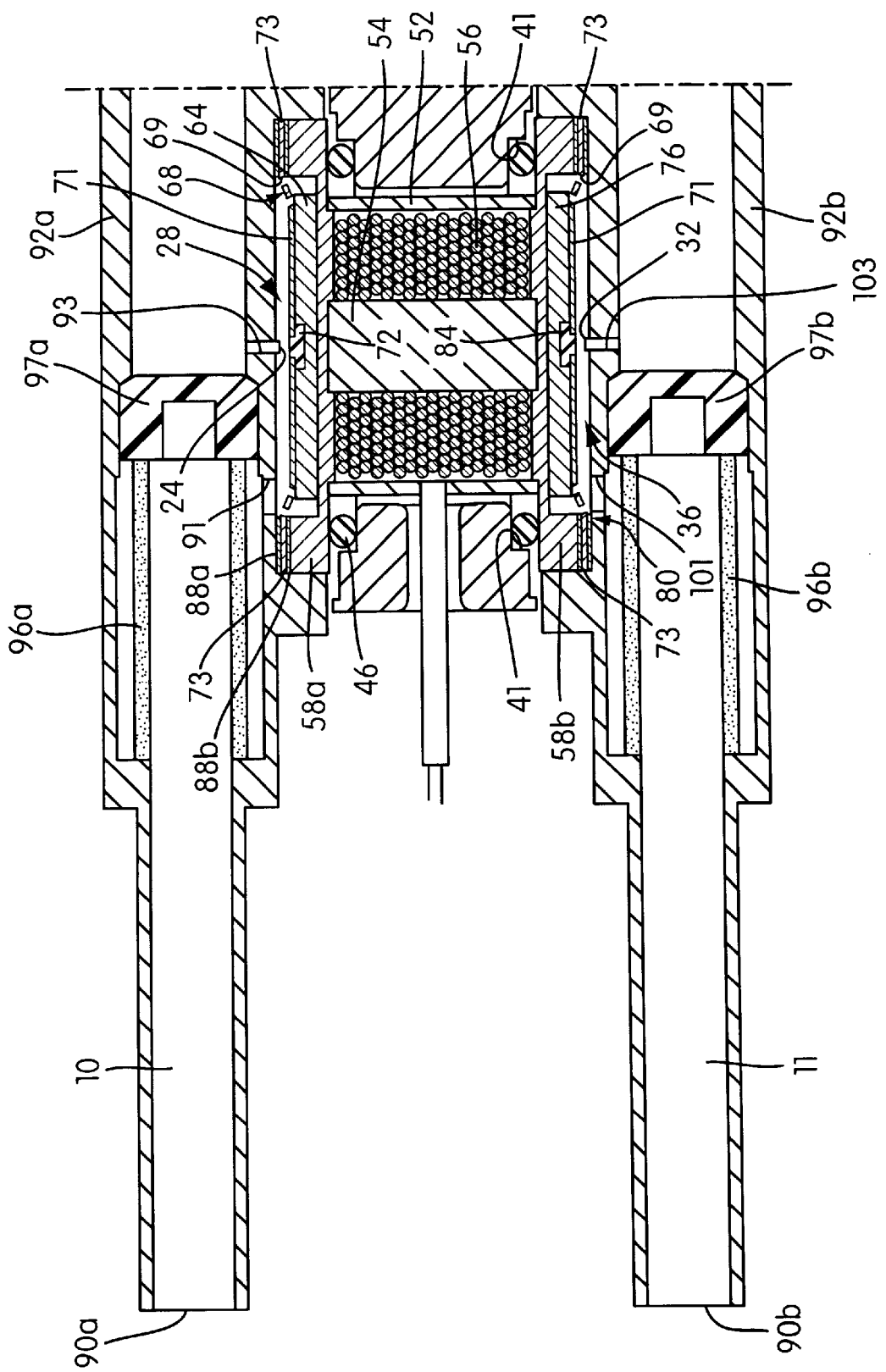
FIG. 7 is an enlarged cross section similar to FIG. 6 showing the upstream fuel valve and the upstream oxidizer valve, but with the power applied.
Figure 8:
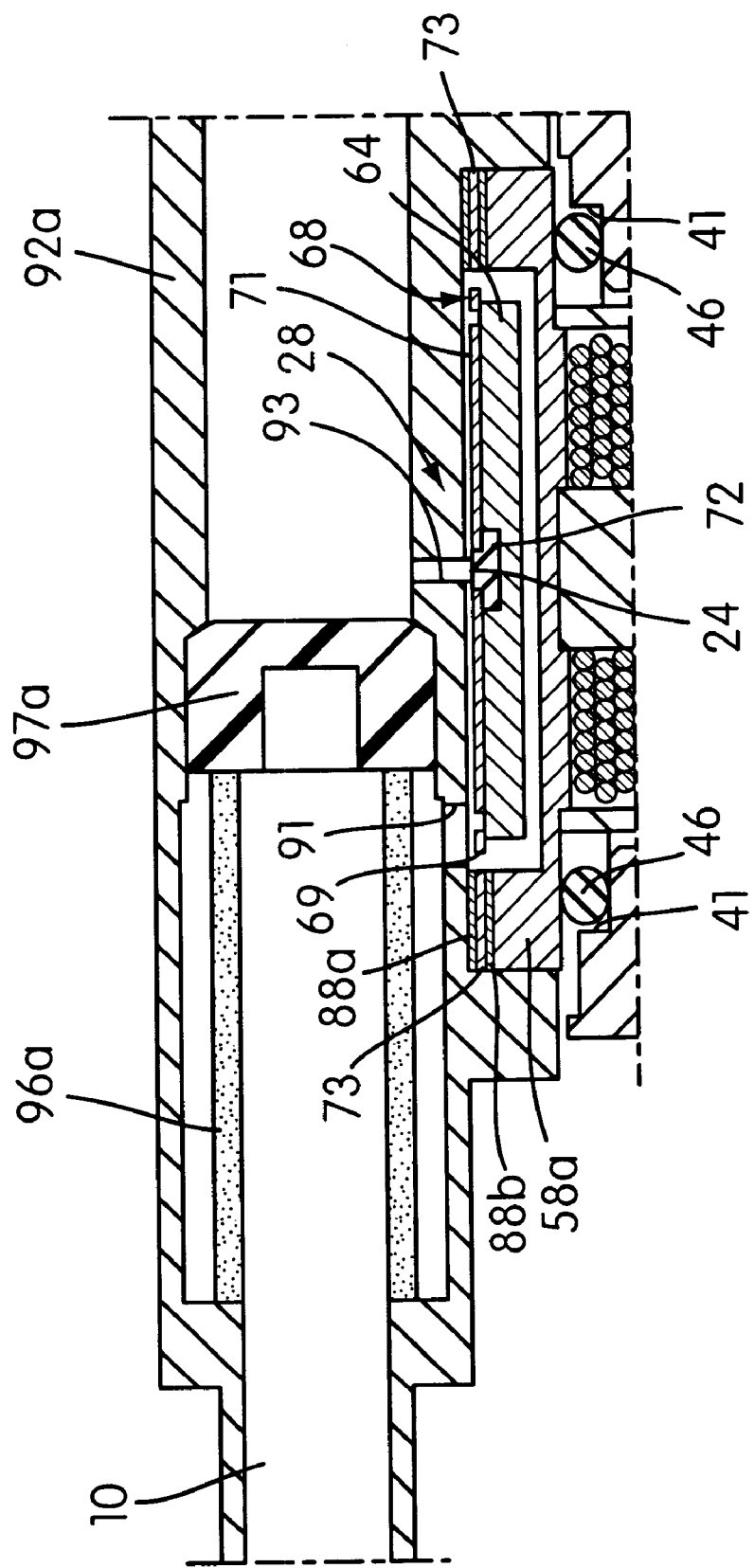
FIG. 8 is a further enlarged cross section of the magnetically actuated valve system similar to FIG. 6 showing the upstream fuel valve.
Figure 9:
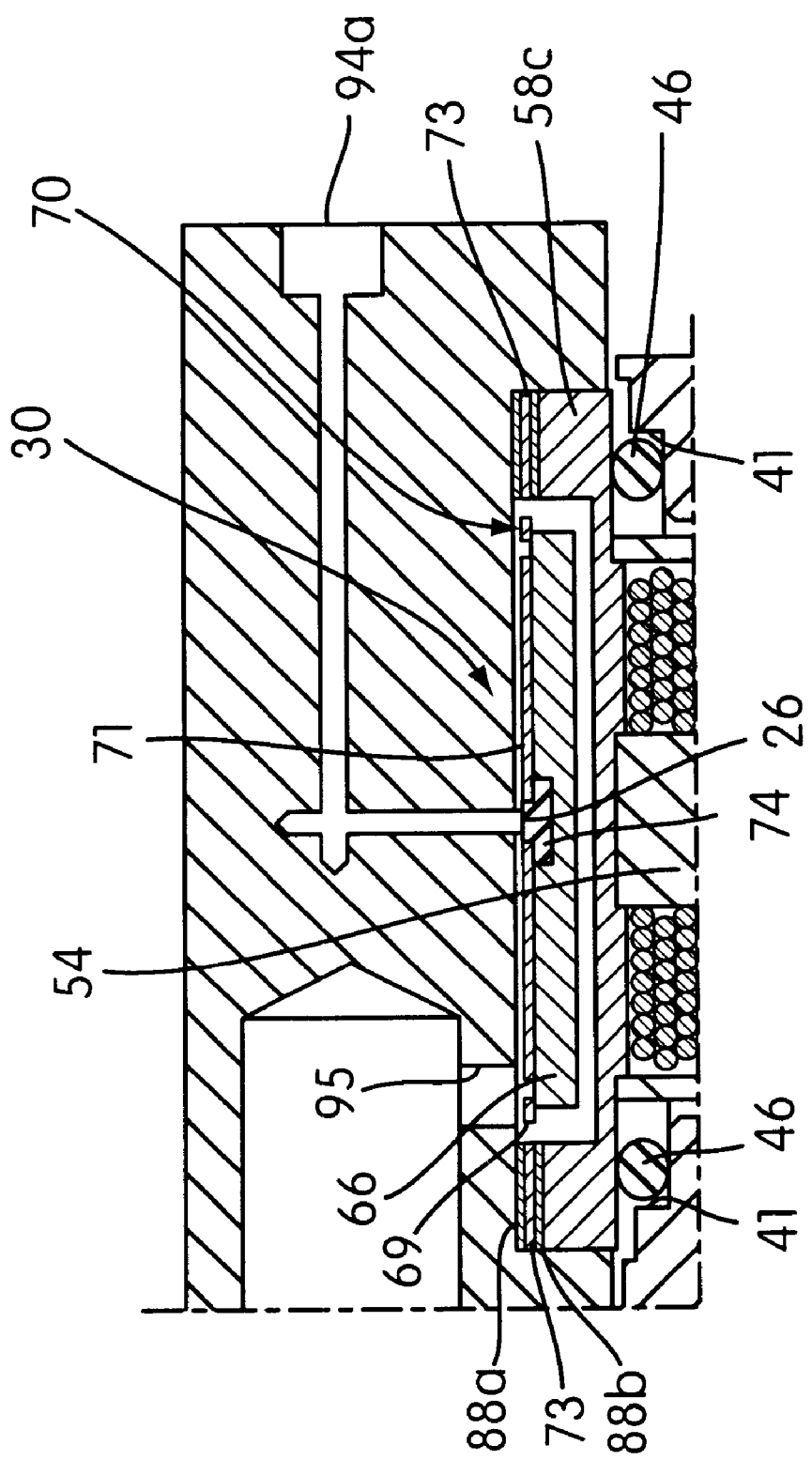
FIG. 9 is a further enlarged cross section similar to FIG. 8 showing the downstream fuel valve of the magnetically actuated valve system.

FIG. 5 is an enlarged perspective view showing S-spring 68, but could be representative of any other S-spring 70, 80 or 82. S-springs 68, 70, 80 and 82 are preferably flat discs having interior walls 69 defining serpentine slots therein. The interior walls 69 are circumferentially positioned around S-springs 68, 70, 80 and 82 in interposing relation between an inner section 71 of each S-spring 68, 70, 80 and 82 and an outer rim 73 of the same S-spring 68, 70, 80 and 82. It may be preferable for S-springs 68, 70, 80 and 82 to be made from ductile, high strength materials with low magnetic flux capacity such as 316L CRES, or 17–4 PH CRES. It is contemplated that disc springs, leaf springs or other spring members may be capable of biasing sealing members 28, 30, 36, 38 against valve seats 24, 26, 32, 34, respectively. The deflection and preload force of S-springs 68, 70, 80 and 82 is permanently set by the thickness of spacing shim stack 88a. Shim stack 88a is used to adjust isolation caps 58a, 58c and 58b, 58d to a position flush with manifold assembly 12, 14, respectively.

As best shown in FIGS. 1–3 and 6–9, fuel manifold assembly 12 and oxidizer manifold assembly 14 further comprise an inlet 90a, 90b, a main body portion 92a, 92b and a thruster interface port 94a, 94b, respectively. Inlet 90a, which is preferably tubular or a thread fitting, extends integrally and is welded to main body portion 92a. Likewise, inlet 90b, which is preferably tubular or a thread fitting, extends integrally and is welded to main body portion 92b. Inlets 90a, 90b are preferably made from titanium, but could be any other suitable low flux capacity material for maintaining fuel and oxidizer in separate flowpaths. Inlets 90a, 90b have an etched disc, diffusion buffed or similar inlet filter 96a, 96b and an inlet plug 97a, 97b, respectively, installed therein. As best shown in FIGS. 1, 2, 6 and 7, inlet plug 97a is welded within conduit 10 between inlet 91 and outlet 93 of the upstream fuel valve. Similarly, inlet plug 97b is welded within conduit 11 between inlet 101 and outlet 103 of the upstream oxidizer valve.

Main body portion 92a of fuel manifold assembly 12 has conduit 10 etched or machined therein and main body portion 92b of oxidizer manifold assembly 14 has conduit 11 etched or machined therein.

Referring back to FIGS. 3 and 4, a pair of circumferentially raised walls 98a, 98b integrally extends from each main body portion 92a, 92b and may have edges spaced from one another, as best shown for the pair of raised walls 98b in FIG. 4. Each pair of raised walls 98a, 98b defines armature receiving spaces, of which only spaces 99b are shown in FIG. 4. Raised walls 98a, 98b could be separate from main body portions 92a, 92b, respectively, and positioned in abutting relation thereto to define armature receiving spaces 99a, 99b, respectively. A pair of fastener receiving openings 100a, 100b integrally extends from opposite sides of main body portions 92a, 92b, respectively. A pair of mounting openings 104a and 104b passes through main body portions 92a, 92b on opposite sides of respective thruster interface ports 94a, 94b for mounting fuel and oxidizer manifold assemblies 12, 14 to the thruster. Thruster interface ports 94a, 94b are disposed on the opposite longitudinal ends of each manifold assembly 12, 14 from respective inlets 90a, 90b.

Upstream and downstream fuel armature members 64, 66 and upstream and downstream oxidizer armature members 76, 78 are preferably flat discs made from high flux capacity material that is compatible with the propellants such as corrosion resistant steel (CRES), for example of XM-27 CRES, and are resistance welded to S-spring 68, 70, respectively. When inner sections 71 of S-springs 68, 70 are joined to upstream and downstream fuel armature members 64, 66, respectively, sealing portions 72, 74 are captured therebetween such that sealing portions 72, 74 extend through center opening 75 of S-springs 68, 70, respectively. Sealing portions 72, 74 may be made from polytetrafluoroethylene (PTFE) or any other suitable material for circumferentially sealing against valve seats 24, 26, respectively, to seal the upstream and downstream fuel valves, respectively.

Similarly, upstream and downstream oxidizer armature members 76, 78 are made from high flux capacity material that is compatible with the propellants such as corrosion resistant steel (CRES), for example of XM-27 CRES, and are resistance welded to S-spring 80, 82, respectively. When the inner sections 71 of S-springs 80, 82 are joined to upstream and downstream oxidizer armature members 76, 78, respectively, sealing portions 84, 86 are captured therebetween such that sealing portions 84, 86 extend through center opening 75 of S-springs 80, 82. Sealing portions 84, 86 may be made from polytetrafluoroethylene (PTFE) or any other suitable material for circumferentially sealing against valve seats 32, 34, respectively to seal the upstream and downstream oxidizer valves, respectively.

Upstream and downstream fuel armature members 64, 66 are installed within the armature receiving spaces defined by circumferentially raised walls 98a extending from fuel manifold assembly 12. Sealing portions 72, 74 contact valve seats 24, 26, respectively, of fuel manifold assembly 12. As isolation caps 58a, 58b are installed, the outer rim of each S-spring 68, 70 is deflected developing a preload on sealing portions 72, 74 against valve seats 24, 26, respectively. Isolation caps 58a, 58c are welded to fuel manifold assembly 12 to prevent external leakage of fuel.

Similarly, upstream and downstream oxidizer armature members 76, 78 are installed within armature receiving spaces 99b defined by circumferentially raised walls 98b extending from oxidizer manifold assembly 14. Sealing portions 84, 86 contact valve seats 32, 34, respectively, of oxidizer manifold assembly 12. As isolation caps 58a, 58b are installed, the outer rim of each S-spring 80, 82 is deflected developing a preload on sealing portions 84, 86 against valve seats 32, 34, respectively. Isolation caps 58b, 58d are welded to oxidizer manifold assembly 14 to prevent external leakage of oxidizer. FIG. 4 illustrates the alignment of fastener receiving openings 100a of fuel manifold assembly 12 with threaded fastener receiving orifices 44a of fastener receiving portions 42. Similarly, fastener receiving openings 100b of oxidizer manifold assembly 14 align with the threaded fastener receiving orifices (not shown) on the opposite longitudinal end of fastener receiving portions 42. A plurality of fasteners 106a and 106b are in the form of tie wired cap screws and have one threaded end thereof. Fasteners 106a extend through fastener receiving openings 100a and into threaded fastener receiving orifices 44a to fixedly secure fuel manifold assembly 12 to magnetic actuator assembly housing 16.

Fasteners 106b extend through fastener receiving openings 100b and into the threaded fastener receiving orifices (not shown) on the opposite ends as threaded fastener receiving orifices 44a to fixedly secure oxidizer manifold assembly 14 and magnetic actuator assembly housing 16 together. It should be noted that in FIGS. 1–9, oxidizer manifold assembly 14 could be shown mounted above magnetic actuator assembly housing structure 16 and fuel manifold assembly 12 could be shown mounted below magnetic actuator assembly housing structure 16.

After titanium fuel and oxidizer manifold assemblies 12, 14 are attached to magnetic actuator assembly housing 16, magnetic solenoid actuators 48, 50 are protected from the ambient environment. Sealing structures 46, preferably in the form of O-rings, are disposed between manifold assemblies 12, 14 and magnetic actuator assembly housing structure 16 within each groove 41 to environmentally seal the enclosure, as best shown in FIGS. 1 and 2. It may be preferable for the O-rings to be made from silicone.

OPERATION

The integrity of each seal may be tested by energizing only one of magnetic solenoid actuators 48, 50 at a time. With one actuator energized and fluids under pressure supplied to both inlets 90a and 90b, the integrity of the seals controlled by the other actuator will be tested. In normal operation, both actuators are energized in unison.

Referring to FIGS. 1, 2 and 6–9, the operation of the magnetically actuated valve system will be fully described below. The operation of fuel manifold assembly 12 will be described as fuel flows from inlet 90a through upstream fuel valve 28 and downstream fuel valve 30 to thruster interface port 94a within fuel manifold assembly 12. Fuel inlet filter 96a protects the upstream and downstream fuel valves from impurities or harmful agents that could deter operation of the upstream and downstream fuel valves. The passing fuel flows through fuel inlet filter 96a before reaching inlet 91 for the upstream fuel valve. The upstream fuel valve controls the fuel flow to inlet 95 for the downstream fuel valve, which in turn controls fuel flow to thruster interface port 94a.

Fuel enters fuel manifold assembly 12 through fuel inlet 90a where inlet plug 97a directs its flow through fuel filter 96a and into the inlet for the fuel upstream valve. Fuel flows into the fuel upstream valve through inlet 91, which is in the form of an opening in fuel manifold assembly 12. Conduit 10 in the main body portion 92a of fuel manifold assembly 12 connects outlet 93 of the upstream fuel valve to inlet 95 of the downstream fuel valve. The downstream fuel valve discharges into the thruster through thruster interface port 94a. The thruster may be included within a spacecraft engine, or any other suitable engine in which two fluids are delivered to combustion chambers.

Before power is applied to coils 56 of upstream and downstream actuators 48, 50, S-springs 68, 70 firmly pre-load sealing portions 72 and 74 against valve seats 24, 26, respectively. As described above, the preload is sufficient to close and seal the upstream and downstream fuel valves against leakage and to prevent liftoff under worst-case vibration loading.

When power is applied to coil 56 of upstream magnetic solenoid actuator 48, a magnetic flux is generated in a magnetic circuit consisting of core 54, case 52, and upstream fuel armature member 64. The magnetic flux in the air gap between each upstream fuel armature member 64, case 52 and core 54 exerts an attractive force on upstream fuel armature member 64. This attractive force overcomes the preload of S-spring 68 causing upstream fuel armature member 64 to be drawn up against isolation cap 58a lifting sealing member 72 off valve seat 24. With sealing member 72 lifted off valve seat 24, fuel is allowed to flow across valve seat 24 to the inlet for the downstream fuel valve. Upstream armature member 64 is held in the power applied, open position as long as power is applied to coil 56 of magnetic solenoid actuator 48.

When power is applied to coil 56 of downstream actuator 50, a magnetic flux is generated in a magnetic circuit consisting of core 54, case 52, and downstream fuel armature member 66. The magnetic flux in the air gap between downstream fuel armature member 66, case 52 and core 54 exerts an attractive force on downstream fuel armature member 66. This attractive force overcomes the preload of S-spring 70 causing downstream fuel armature member 66 to be drawn up against the isolation cap 58c lifting sealing member 74 off valve seat 26. With sealing member 74 off valve seat 26, fuel is allowed to flow across valve seat 26 and through thruster interface port 94a into a thruster combustion portion of an engine, for example a spacecraft engine. Downstream armature member 66 is held in the power applied, open position as long as power is applied to coil 56 of magnetic solenoid actuator 50.

When the power is removed from coils 56 of upstream and downstream magnetic solenoid actuators 48, 50, the magnetic fields collapse, thus reducing the magnetic attracting force on upstream and downstream fuel armature members 64, 66 to virtually zero. Without magnetic force to oppose them, S-springs 68, 70 drive upstream and downstream fuel armature members 64, 66 and the sealing portions 72 and 74, respectively, to the power removed, closed position and reapply the preload.

Because the operation and nature of oxidizer manifold assembly 14 is basically the same as for fuel manifold assembly 12, it is therefore unnecessary to repeat details. Fuel and oxidizer simultaneously flow into and through conduits 10, 11 of fuel and oxidizer manifold assemblies 12, 14, respectively, so that both fuel and oxidizer will be maintained in correct proportions therein and directed into the thruster portion of an engine whereby the fuel will be ignited.

Alternatively, a permanent magnet (not shown) could be inserted into each core 54 so that upstream and downstream actuators 48, 50 would be the same in construction and operation. Only the operation of upstream actuator 48 will be described below.

A first short electrical pulse is applied to coil 56 of upstream actuator 48 to generate a magnetic flux in a magnetic circuit consisting of case 52, core 54 and upstream fuel armature member 64. The magnetic flux in the air gap between each upstream fuel armature 64, case 52 and core 54 exerts a larger attractive force on upstream fuel armature 64 than that of the permanent magnet. This attractive force overcomes the preload of S-spring 68 causing upstream fuel armature 64 to be drawn up against isolation cap 58a lifting seat member 72 off valve seat 24. With sealing member 72 lifted off valve seat 24, fuel is allowed to flow across valve seat 24 to the inlet for the downstream fuel valve. The permanent magnet positioned axially within core 54 holds upstream armature member 64 in the power applied, open position.

To reduce the magnetic attractive force on upstream armature member 64, a second short electrical pulse having a reverse polarity of the first pulse is applied to coil 56 to create a magnetic flux polarity opposite of the permanent magnet. Reversed polarity of the electromagnet is preferably achieved by using a reversed polarity electric pulse or by providing a second coil along the same axis as coil 54 but with an opposite winding direction. Then, S-spring 68 would drive upstream fuel armature member 64 and sealing portion 72, respectively, to the power removed, closed position and reapply the preload. The air gap between each upstream fuel armature member 64, case 52 and core 54, permanent magnet strength and spring constant of S-spring 68 are selected so that the permanent magnet is insufficiently powerful to exert an attractive force able to overcome the preload of S-spring 68 when in the closed position.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A magnetically actuated valve system, comprising:
   a first conduit;
   a second conduit;
   a first sealing structure, moveable in response to a magnetic force in a first direction to an open position and biased toward a closed position, the closed position preventing fluid flow through the first conduit;

a second sealing structure, moveable in response to a magnetic force in a second direction, substantially opposite to the first direction, to an open position and biased toward a closed position, the closed position preventing fluid flow through the second conduit;

a magnetic actuator assembly, constructed and arranged to actuate the first and second sealing structures substantially simultaneously by moving the first and second sealing structures in the first and second directions, respectively;

a first isolation cap located between said first sealing structure and said magnetic actuator assembly to prevent fluid leakage from said first conduit; and a second isolation cap located between said second sealing structure and said magnetic actuator assembly to prevent fluid leakage from said second conduit.

2. A magnetically actuated valve system as in claim 1, further comprising:

a first manifold assembly in which the first conduit is disposed; and a second manifold assembly in which the second conduit is disposed, such that separate fluids may be carried within each of the first and second conduits.

3. A magnetically actuated valve system as in claim 1, wherein each sealing structure is spring biased toward the closed position.

4. A magnetically actuated valve system as in claim 2, wherein each manifold assembly comprises:

an inlet;

a main body portion having said first conduit therein; and an outlet for transporting a fuel from said inlet through said conduit to said outlet.

5. A magnetically actuated valve system as in claim 1, wherein each sealing structure comprises:

a respective armature member, made of high flux capacity material;

a sealing portion carried by said armature member for preventing fluid flow through a respective one of the first and second conduits; and a spring member constructed and arranged to bias said sealing structure in the closed position.

6. A magnetically actuated valve system as in claim 5, wherein each sealing portion is made of polytetrafluoroethylene.

7. A magnetically actuated valve system as in claim 1, wherein said magnetic actuator assembly comprises:

a conductive coil;

a core extending through said coil; and a case surrounding said coil.

8. A magnetically actuated valve system as in claim 1, wherein:

the first sealing structure and the second sealing structure move toward one another when moving into the open position.

9. A magnetically actuated valve system comprising:

a first conduit;

a second conduit;

a first sealing structure, moveable in response to a magnetic force in a first direction to an open position and biased toward a closed position, the closed position preventing fluid flow through the first conduit;

a second sealing structure, moveable in response to a magnetic force in a second direction, substantially opposite to the first direction, to an open position and biased toward a closed position, the closed position preventing fluid flow through the second conduit;

a magnetic actuator assembly, constructed and arranged to actuate the first and second sealing structures substantially simultaneously by moving the first and second sealing structures in the first and second directions, respectively;

a third sealing structure disposed downstream of the first sealing structure, moveable in response to a magnetic force in the first direction to an open position and biased toward a closed position, the closed position preventing fluid flow through the first conduit;

a fourth sealing structure disposed downstream of the second sealing structure, moveable in response to a magnetic force in the second direction to an open position and biased toward a closed position, the closed position preventing fluid flow through the second conduit; and a second magnetic actuator assembly, disposed between the first conduit and the second conduit, constructed and arranged to actuate the second and third sealing structures substantially simultaneously by moving the second and third sealing structures in the first and second directions, respectively.

10. A magnetically actuated valve system as in claim 9, further comprising first and second manifold assemblies, wherein the first and second conduits are disposed in the first and second manifold assemblies.

11. A magnetically actuated valve system as in claim 10, wherein each manifold assembly comprises:

an inlet;

a main body portion having said first conduit etched therein; and an outlet for transporting a fuel from said inlet through said first conduit to said outlet.

12. A magnetically actuated valve system as in claim 9, wherein the first and third sealing structures are disposed as parallel elements of a first fluid circuit which includes the first conduit and said second and fourth sealing structures are disposed as parallel elements of a second fluid circuit which includes the second conduit.

13. A magnetically actuated valve system as in claim 12, wherein each of said sealing structures comprises a respective sealing portion for preventing fluid flow through a respective one of the conduits, and a spring member constructed and arranged to bias said sealing structure toward said closed position.

14. A magnetically actuated valve system as in claim 9, wherein each magnetic actuator assembly comprises:

a conductive coil;

a core extending through said coil; and a case surrounding said coil.

15. A magnetically actuated valve system comprising:

a first conduit;

a second conduit;

a first sealing structure, moveable in response to a magnetic force in a first direction to an open position and biased toward a closed position, the closed position preventing fluid flow through the first conduit;

a second sealing structure, moveable in response to a magnetic force in a second direction, substantially opposite to the first direction, to an open position and biased toward a closed position, the closed position preventing fluid flow through the second conduit; and a magnetic actuator assembly, constructed and arranged to actuate the first and second sealing structures substantially simultaneously by moving the first and second sealing structures in the first and second directions, respectively, wherein said magnetic actuator assembly includes a magnet constructed and arranged to produce a magnetic biasing force on the first and second sealing structures toward their open positions insufficient to overcome the bias toward the closed position, said magnetic actuator assembly constructed and arranged to produce a first impulse to actuate the first and second sealing structures toward their respective open positions such that the magnetic biasing force retains them in their respective open positions, and to produce a second impulse to overcome the magnetic biasing force and to actuate the first and second sealing structures toward their respective closed positions.

16. A thruster valve assembly, comprising:

a first manifold assembly having a first conduit therein and a valve seat;

a second manifold assembly having a second conduit therein said a second valve seat, the second conduit being disposed in parallel with the first conduit;

a magnetic actuator housing assembly disposed between said first and second manifold assemblies;

a first sealing structure disposed between said magnetic actuator housing assembly and said first manifold assembly, said first sealing structure being movable to an open position for unblocking said first valve seat and spring biased toward a closed position for blocking said first valve seat to prevent fluid flow through the first conduit;

a second sealing structure disposed between said magnetic actuator housing assembly and said second manifold assembly, said second sealing structure being movable to an open position for unblocking said second valve seat and spring biased toward a closed position for blocking said second valve seat to prevent fluid flow through the second conduit; and a first magnetic actuator assembly, disposed within a magnetic actuator assembly receiving portion of said magnetic actuator housing assembly between the first conduit and the second conduit, constructed and arranged to exert a magnetic force on the first sealing structure and the second sealing structure substantially simultaneously, the magnetic force moving the first sealing structure and the second sealing structure in respectively opposite directions and into their respective open positions, wherein said first manifold assembly further includes a third valve seat disposed downstream of the first valve seat, and said second manifold assembly further includes a fourth valve seat disposed downstream of the second valve seat.

17. A thruster valve assembly as in claim 16, further comprising:

a third sealing structure disposed downstream of the first sealing structure and between said magnetic actuator housing assembly and said first manifold assembly, said third sealing structure being movable to an open position for unblocking said third valve seat and spring biased toward a closed position for blocking said third valve seat to prevent fluid flow through the first conduit.

18. A thruster valve assembly as in claim 17, further comprising:

a fourth sealing structure disposed downstream of the second sealing structure and between said magnetic actuator housing assembly and said second manifold assembly, said fourth sealing structure being movable to an open position for unblocking said fourth valve seat and spring biased toward a closed position for blocking said fourth valve seat to prevent fluid flow through the second conduit.

19. A thruster valve assembly as in claim 18, further comprising:

a second magnetic actuator assembly disposed within a second magnetic actuator assembly receiving portion of said magnetic actuator housing assembly between the first conduit and the second conduit and constructed and arranged to exert a magnetic force on the third sealing structure and the fourth sealing structure substantially simultaneously, the magnetic force moving the third sealing structure and the fourth sealing structure in respectively opposite directions into their respective open positions.

20. A thruster valve assembly as in claim 16, wherein:

the first manifold assembly and the second manifold assembly each are made of a first material, the actuator assembly is made of a second material, the first manifold assembly, the second manifold assembly and the actuator assembly are mechanically fastened together, and each of said sealing structures is enclosed within a respective manifold assembly.

* * * * *